(12) United States Patent
Mitsutani

(10) Patent No.: US 10,876,440 B2
(45) Date of Patent: Dec. 29, 2020

(54) VALVE TIMING ADJUSTMENT DEVICE

(71) Applicant: DENSO CORPORATION, Kariya (JP)

(72) Inventor: Tetsuro Mitsutani, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/502,376

(22) Filed: Jul. 3, 2019

(65) Prior Publication Data

US 2019/0323393 A1 Oct. 24, 2019

Related U.S. Application Data

(63) Continuation of application No. PCT/JP2018/001373, filed on Jan. 18, 2018.

(30) Foreign Application Priority Data

Jan. 19, 2017 (JP) .................................. 2017-007515

(51) Int. Cl.
*F01L 1/34* (2006.01)
*F01M 1/14* (2006.01)
(Continued)

(52) U.S. Cl.
CPC ............. *F01M 1/14* (2013.01); *F01L 1/3442* (2013.01); *F01M 1/12* (2013.01); *F16K 11/0712* (2013.01);
(Continued)

(58) Field of Classification Search
CPC ..................... F01L 1/3442; F01L 1/356; F01L 2001/34433; F01L 2001/34426;
(Continued)

(56) References Cited

U.S. PATENT DOCUMENTS 10,260,384 B2 * 4/2019 Mitsutani .............. F01L 1/3442
2016/0024978 A1 1/2016 Lichti
2018/0112563 A1 4/2018 Mitsutani

FOREIGN PATENT DOCUMENTS

WO 2018/135573 7/2018
WO 2018/135584 7/2018
(Continued)

OTHER PUBLICATIONS

U.S. Appl. No. 16/502,333 of Mitsutani, filed Jul. 3, 2019 (57 pages).
(Continued)

*Primary Examiner* — Zelalem Eshete
(74) *Attorney, Agent, or Firm* — Nixon & Vanderhye PC

(57) ABSTRACT

A spool is configured to reciprocate at an inside space of a sleeve and includes: a spool tube; a spool cover, which closes an end portion of the spool tube located on a camshaft side; a pressure accumulation space, which is formed at an inside of the spool tube; a supply passage, which is configured to connect between the pressure accumulation space and a supply port; a control passage, which is configured to connect between the pressure accumulation space and a primary control port; and a control passage, which is configured to connect between the pressure accumulation space and a secondary control port. A variable volume space is formed between the spool cover and a sleeve bottom. The sleeve includes a breathing hole at an outside of the inside space while the breathing hole is a hole that communicates between the variable volume space and the atmosphere.

11 Claims, 8 Drawing Sheets

(51) Int. Cl.
   *F01L 1/344*   (2006.01)
   *F01M 1/12*    (2006.01)
   *F16K 11/07*   (2006.01)
   *F02D 13/02*   (2006.01)

(52) U.S. Cl.
   CPC . *F01L 2001/34426* (2013.01); *F02D 13/0219* (2013.01)

(58) Field of Classification Search
   CPC ... F01L 2001/34469; F01L 2001/34423; F01L 2001/34453; F01M 1/14; F01M 1/12; F01M 9/10; F16K 11/0712; F02D 13/0219
   See application file for complete search history.

(56)            References Cited

FOREIGN PATENT DOCUMENTS

| WO | 2018/135586 | 7/2018 |
| WO | 2018/164022 | 9/2018 |
| WO | 2018/194076 | 10/2018 |

OTHER PUBLICATIONS

U.S. Appl. No. 16/502,361 of Mitsutani, filed Jul. 3, 2019 (52 pages).
U.S. Appl. No. 16/502,404 of Mitsutani, et al. filed Jul. 3, 2019 (100 pages).
U.S. Appl. No. 16/542,460 of Mitsutani, filed Aug. 16, 2019 (66 pages).
U.S. Appl. No. 16/555,122 of Mitsutani, filed Aug. 29, 2019 (61 pages).

\* cited by examiner

VALVE TIMING ADJUSTMENT DEVICE

CROSS REFERENCE TO RELATED APPLICATIONS

This application is a continuation application of International Patent Application No. PCT/JP2018/001373 filed on Jan. 18, 2018, which designated the U.S. and claims the benefit of priority from Japanese Patent Application No. 2017-7515 filed on Jan. 19, 2017. The entire disclosures of all of the above applications are incorporated herein by reference.

TECHNICAL FIELD

The present disclosure relates to a valve timing adjustment device.

BACKGROUND

There is known a valve timing adjustment device that is installed in a drive force transmission path for transmitting a drive force from a drive shaft to a driven shaft of an internal combustion engine and adjusts a valve timing of an intake valve or an exhaust valve that is driven to open and close by the driven shaft. In a case where the valve timing adjustment device is a hydraulic type, the valve timing adjustment device includes: a housing that is rotated synchronously with one of the drive shaft and the driven shaft; and a vane rotor that is fixed to an end portion of the other one of the drive shaft and the driven shaft. The valve timing adjustment device rotates the vane rotor in an advancing direction or a retarding direction relative to the housing by supplying hydraulic oil to one of a primary hydraulic chamber and a secondary hydraulic chamber defined by the vane rotor in the inside of the housing. The hydraulic oil is supplied through a passage change valve.

SUMMARY

According to one aspect of the present disclosure, there is provided a valve timing adjustment device that is configured to be installed in a drive force transmission path for transmitting a drive force from a drive shaft to a driven shaft of an internal combustion engine and is configured to adjust a valve timing of a valve that is driven to open and close by the driven shaft. The valve timing adjustment device includes a housing, a vane rotor, a sleeve and a spool. The sleeve includes: a sleeve tube; and a sleeve bottom that closes an end portion of the sleeve tube. The spool includes: a spool tube that is installed at an inside space of the sleeve and is configured to reciprocate in an axial direction of the spool. The spool forms a variable volume space between the spool and the sleeve bottom while the variable volume space is a space, a volume of which is variable. The sleeve includes a breathing hole that communicates between the variable volume space and an atmosphere and is located at an outside of the inside space of the sleeve.

BRIEF DESCRIPTION OF DRAWINGS

The present disclosure, together with additional objectives, features and advantages thereof, will be best understood from the following description in view of the accompanying drawings.

DETAILED DESCRIPTION

Figure 1:
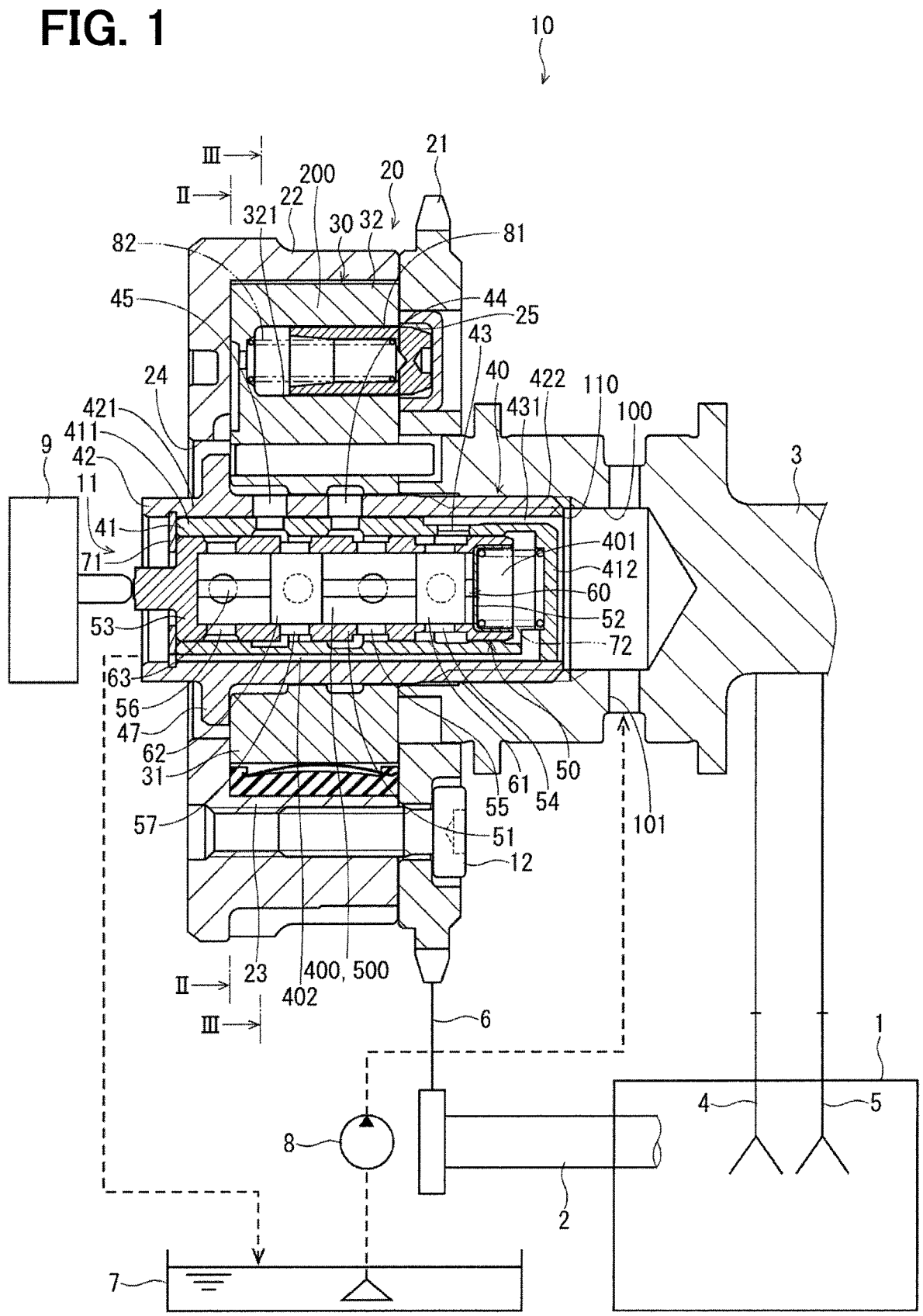
FIG. 1 is a cross-sectional view illustrating a valve timing adjustment device according to a first embodiment of the present disclosure.

For example, in a previously proposed valve timing adjustment device, a sleeve and a spool of a passage change valve are placed at a center of a vane rotor. In this way, a length of an oil path, which extends from the passage change valve to a primary hydraulic chamber or a secondary hydraulic chamber partitioned by a vane of the vane rotor, is reduced, and thereby the responsiveness of the valve timing adjustment device is improved.

In the previously proposed valve timing adjustment device, the spool, which is shaped in a tubular form, is configured to reciprocate in an axial direction at an inside space that is a space at an inside of the sleeve, which is shaped in a tubular form. Thereby, the spool can change a supply destination of the hydraulic oil between the primary hydraulic chamber or the secondary hydraulic chamber. The valve timing adjustment device includes a seal member that partitions the space at the inside of the spool into a pressure accumulation space and a breathing hole. The pressure accumulation space is communicated with a supply passage, to which the hydraulic oil is supplied, and the pressure accumulation space can be communicated with the primary hydraulic chamber or the secondary hydraulic chamber. The breathing hole enables communication between a variable volume space, which is formed between an end portion of the spool and an end portion of the sleeve, and the outside of the valve timing adjustment device, that is, the breathing hole enables communication between the variable volume space and the atmosphere. As a result, the pressure in the variable volume space can be made equal to the atmospheric pressure. Therefore, the spool can smoothly reciprocate in the axial direction at the inside of the sleeve.

As described above, in the previously proposed valve timing adjustment device, the seal member, which is formed separately from the spool, is placed at the inside of the spool, and the space at the inside of the spool is partitioned into the pressure accumulation space and the breathing hole by the seal member. With this configuration, it is difficult to seal between the pressure accumulation space and the breathing hole, so that the hydraulic oil may possibly leak from the pressure accumulation space to the breathing hole. Accordingly, the pressure of the hydraulic oil to be supplied to the primary hydraulic chamber or the secondary hydraulic chamber is decreased. This may possibly result in a deterioration of the responsiveness of the valve timing adjustment device or may possible result in a malfunction of the valve timing adjustment device.

According to the present disclosure, there is provided a valve timing adjustment device that is configured to be installed in a drive force transmission path for transmitting a drive force from a drive shaft to a driven shaft of an internal combustion engine and is configured to adjust a valve timing of a valve that is driven to open and close by the driven shaft. The valve timing adjustment device includes a housing, a vane rotor, a sleeve and a spool.

One of the drive shaft and the driven shaft is defined as a first shaft while the other one of the drive shaft and the driven shaft is defined as a second shaft. In such a case, the housing is configured to be rotated synchronously with the first shaft, and the housing is configured to be fitted to an end portion of the second shaft and is configured to be rotatably supported by the second shaft.

The vane rotor is configured to be fixed to the end portion of the second shaft and includes a vane that partitions an inside space of the housing into a primary hydraulic chamber and a secondary hydraulic chamber while the primary hydraulic chamber is located on one side of the vane in a circumferential direction, and the secondary hydraulic chamber is located on the other side of the vane in the circumferential direction. The vane rotor is configured to be rotated relative to the housing depending on a pressure of hydraulic oil supplied from a hydraulic oil supply source to the primary hydraulic chamber and a pressure of the hydraulic oil supplied from the hydraulic oil supply source to the secondary hydraulic chamber.

The sleeve includes: a sleeve tube; a sleeve bottom that closes an end portion of the sleeve tube; an inside space that is formed at an inside of the sleeve tube; a supply port that is communicated with the hydraulic oil supply source; a primary control port that is communicated with the primary hydraulic chamber; and a secondary control port that is communicated with the secondary hydraulic chamber.

The spool includes: a spool tube that is installed at the inside space of the sleeve and is configured to reciprocate in an axial direction of the spool; a spool cover that closes an end portion of the spool tube; a pressure accumulation space that is formed at an inside of the spool tube; a supply passage that is configured to connect between the pressure accumulation space and the supply port; and a control passage that is configured to connect between the pressure accumulation space and the primary control port or the secondary control port. The spool forms a variable volume space between the spool and the sleeve bottom while the variable volume space is a space, a volume of which is variable.

In the present embodiment, the sleeve includes a breathing hole that communicates between the variable volume space and an atmosphere and is located at an outside of the inside space of the sleeve. The pressure of the variable volume space can be made equal to the atmospheric pressure through the breathing hole. Therefore, the spool can smoothly reciprocate in the axial direction at the inside of the sleeve. In this way, the responsiveness of the valve timing adjustment device can be improved.

Furthermore, in the present disclosure, the pressure accumulation space is formed at the inside of the spool tube, and the breathing hole is formed at the outside of the inside space of the sleeve. Specifically, in the present disclosure, the breathing hole is formed at the outside of the spool. Therefore, the partitioning member, which partitions the space at the inside of the spool into the pressure accumulation space and the breathing hole, is not placed at the inside of the spool unlike the previously proposed technique. Thus, the hydraulic oil will not leak from the pressure accumulation space to the breathing hole at the inside of the spool. Therefore, it is possible to limit a decrease in the pressure of the hydraulic oil to be supplied to the primary hydraulic chamber or the secondary hydraulic chamber. In this way, the responsiveness of the valve timing adjustment device can be further improved.

In the present disclosure, when the sleeve and the spool of the passage change valve are placed at the center of the vane rotor, the length of the oil path from the passage change valve to the primary hydraulic chamber and the secondary hydraulic chamber is reduced, and thereby the responsiveness of the valve timing adjustment device can be further improved.

Hereinafter, a valve timing adjustment device according to a plurality of embodiments of the present disclosure will be described with reference to the drawings. Components that are substantially the same in the plurality of embodiments are denoted by the same reference signs and will not be described redundantly.

First Embodiment

FIG. 1 illustrates a valve timing adjustment device according to a first embodiment of the present disclosure. The valve timing adjustment device 10 changes a rotational phase of a camshaft 3 relative to a crankshaft 2 of an engine 1 (serving as an internal combustion engine), so that the valve timing adjustment device 10 adjusts a valve timing of intake valves 4 among the intake valves 4 and exhaust valves 5 driven to open and close by the camshaft 3. The valve timing adjustment device 10 is installed in a drive force transmission path that extends from the crankshaft 2 to the camshaft 3. The crankshaft 2 corresponds to a drive shaft. The camshaft 3 corresponds to a driven shaft.

The structure of the valve timing adjustment device 10 will be described with reference to FIGS. 1 and 2.

The valve timing adjustment device 10 includes a housing 20, a vane rotor 30, and a passage change valve 11.

The housing 20 includes a sprocket 21 and a case 22. The sprocket 21 is fitted to an end portion of the camshaft 3. The camshaft 3 rotatably supports the sprocket 21. A chain 6 is wound around the sprocket 21 and the crankshaft 2. The sprocket 21 is rotated synchronously with the crankshaft 2. The case 22 is shaped in a bottomed tubular form. The case 22 is fixed to the sprocket 21 by bolts 12 while an opening end of the case 22 contacts the sprocket 21. The case 22 forms a plurality of partition wall portions 23 that inwardly project in the radial direction. An opening 24 is formed at a center of a bottom of the case 22 such that the opening 24 opens to a space, which is located at the outside of the case 22. The opening 24 is located on an opposite side of the vane rotor 30, which is opposite to the camshaft 3.

The vane rotor 30 has a boss 31 and a plurality of vanes 32. The boss 31 is shaped in a tubular form and is fixed to the end portion of the camshaft 3. Each of the vanes 32 outwardly projects from the boss 31 in the radial direction and is placed between corresponding adjacent two of the partition wall portions 23. An inside space 200 of the housing 20 is divided into a plurality of retard chambers 201 and a plurality of advance chambers 202 by the vanes 32. Each of the retard chambers 201 corresponds to a primary hydraulic chamber and is positioned on one side of the corresponding vane 32 in the circumferential direction. Each of the advance chambers 202 corresponds to a secondary hydraulic chamber and is positioned on the other side of the corresponding vane 32 in the circumferential direction. The vane rotor 30 rotates relative to the housing 20 in a retarding direction or an advancing direction according to an oil pressure in the respective retard chambers 201 and an oil pressure in the respective advance chambers 202.

The passage change valve 11 has a sleeve 40, a spool 50 and a check valve 60.

The sleeve 40 has an inner sleeve 41, an outer sleeve 42, a plurality of supply ports 43, a plurality of primary control ports 44, a plurality of secondary control ports 45 and a retaining portion 47.

The inner sleeve 41 is made of metal, such as aluminum, which has relatively low hardness. The inner sleeve 41 has a sleeve tube 411 and a sleeve bottom 412. The sleeve tube 411 is shaped in a substantially cylindrical tubular form. The sleeve bottom 412 is integrally formed with the sleeve tube 411 in one piece such that the sleeve bottom 412 closes one end portion of the sleeve tube 411.

The outer sleeve 42 is made of metal, such as iron. The outer sleeve 42 has a sleeve tube 421 and a threaded portion 422. The sleeve tube 421 is shaped in a substantially cylindrical tubular form. The threaded portion 422 is formed at an outer wall of one end portion of the sleeve tube 421.

The inner sleeve 41 is placed at an inside of the outer sleeve 42 such that the sleeve bottom 412 is placed at the axial side where the threaded portion 422 is placed. An outer wall of the inner sleeve 41 is fitted to an inner wall of the outer sleeve 42. An inside space 400, which is shaped in a substantially cylindrical form, is formed at an inside of the sleeve tube 411 of the inner sleeve 41 placed at the inside of the sleeve tube 421 of the outer sleeve 42.

Each of the supply ports 43 is formed such that the supply port 43 connects between the outer wall and an inner wall of the sleeve tube 411 of the inner sleeve 41. The outer wall of an end portion of the sleeve tube 411 of the inner sleeve 41, which is located on the sleeve bottom 412 side, is partially cut out in the circumferential direction. As a result, a cut-out passage 431 is formed between the sleeve tube 411 and the sleeve tube 421. The inside space 400 is communicated with the space at the outside of the sleeve 40 through the supply ports 43 and the cut-out passage 431.

Each of the primary control ports 44 is formed such that the primary control port 44 connects between the outer wall of the sleeve tube 421 of the outer sleeve 42 and the inner wall of the sleeve tube 411 of the inner sleeve 41. The plurality of primary control ports 44 is arranged one after the other in the circumferential direction of the sleeve 40.

Each of the secondary control ports 45 is formed such that the secondary control port 45 connects between the outer wall of the sleeve tube 421 of the outer sleeve 42 and the inner wall of the sleeve tube 411 of the inner sleeve 41. The plurality of secondary control ports 45 is arranged one after the other in the circumferential direction of the sleeve 40.

The supply ports 43, the primary control ports 44 and the secondary control ports 45 are arranged in this order at predetermined intervals from one end side to the other end side of the sleeve 40.

The retaining portion 47 is shaped in a ring form and radially outwardly projects from the outer wall of the other end portion of the sleeve tube 421.

A shaft hole 100 and a plurality of supply holes 101 are formed at the end portion of the camshaft 3 located on the valve timing adjustment device 10 side. The shaft hole 100 is formed to extend in the axial direction of the camshaft 3 from a center of an end surface of the camshaft 3, which is located on the valve timing adjustment device 10 side. Each of the supply holes 101 is formed such that the supply hole 101 inwardly extend from an outer wall of the camshaft 3 in the radial direction and is communicated with the shaft hole 100.

A shaft-side threaded portion 110 is formed at an inner wall of the shaft hole 100 of the camshaft 3 to threadably engage with the threaded portion 422 of the outer sleeve 40.

The sleeve 40 is inserted through the inside of the boss 31 of the vane rotor 30 and is fixed to the camshaft 3 such that the threaded portion 422 of the sleeve 40 is engaged with the shaft-side threaded portion 110 of the camshaft 3. At this time, the retaining portion 47 of the sleeve 40 retains an end surface of the boss 31 of the vane rotor 30, which is opposite to the camshaft 3. In this way, the vane rotor 30 is fixed to the camshaft 3 such that the vane rotor 30 is held between the camshaft 3 and the retaining portion 47. The sleeve 40 is thus installed to the center of the vane rotor 30.

An oil pump 8 is connected to the supply holes 101. The oil pump 8 suctions the hydraulic oil stored in the oil pan 7 and supplies the suctioned hydraulic oil to the supply holes 101. As a result, the hydraulic oil flows into the shaft hole 100. Here, the oil pump 8 corresponds to a hydraulic oil supply source.

The hydraulic oil, which is supplied to the shaft hole 100, is conducted to the inside space 400 through the cut-out passage 431 and the supply ports 43.

In a state where the sleeve 40 is installed at the center of the vane rotor 30, the primary control ports 44 are communicated with the retard chambers 201 through retard passages 301 formed at the boss 31. Furthermore, the secondary control ports 45 are communicated with the advance chambers 202 through advance passages 302 formed at the boss 31.

The spool 50 has a spool tube 51, a spool cover 52, a spool bottom 53, a plurality of supply passages 54, a plurality of primary control passages 55, a plurality of secondary control passages 56 and a plurality of recycle passages 57. The primary control passages 55 and the secondary control passages 56 serve as control passages.

The spool tube 51 is shaped in a substantially cylindrical tubular form. The spool cover 52 is formed such that the spool cover 52 closes one end portion of the spool tube 51. In the present embodiment, the spool cover 52 is formed separately from the spool tube 51. The spool bottom 53 is formed integrally with the spool tube 51 in one piece such that the spool bottom 53 closes the other end portion of the spool tube 51. A pressure accumulation space 500, which is shaped in a substantially cylindrical form, is formed by an inner wall of the spool tube 51, the spool cover 52 and the spool bottom 53.

Each of the supply passages 54 is formed such that the supply passage 54 connects between the inner wall of the spool tube 51 and an annular recess, which is formed at an outer wall of the spool tube 51. The supply passages 54 are arranged one after the other in the circumferential direction of the spool 50.

Each of the primary control passages 55 is formed such that the primary control passage 55 connects between the inner wall of the spool tube 51 and an annular recess, which is formed at the outer wall of the spool tube 51. The primary control passages 55 are arranged one after the other in the circumferential direction of the spool 50.

Each of the secondary control passages 56 is formed such that the secondary control passage 56 connects between the inner wall of the spool tube 51 and an annular recess, which is formed at the outer wall of the spool tube 51. The secondary control passages 56 are arranged one after the other in the circumferential direction of the spool 50.

Each of the recycle passages 57 is formed such that the recycle passage 57 connects between the inner wall of the spool tube 51 and an annular recess, which is formed at the outer wall of the spool tube 51. The recycle passages 57 are arranged one after the other in the circumferential direction of the spool 50.

The supply passage 54, the primary control passage 55, the recycle passage 57 and the secondary control passage 56 are in this order at predetermined intervals from one end side to the other end side of the spool 50.

The spool 50 is installed at the inside of the sleeve 40, that is, the spool 50 is installed at the inside space 400 such that the spool cover 52 faces the sleeve bottom 412. The spool 50 can reciprocate in the axial direction at the inside space 400.

A retaining portion 71 is located on a side of the spool tube 51 that is opposite to the sleeve bottom 412. The retaining portion 71 is shaped in a ring form, and an outer periphery of the retaining portion 71 is fitted to the inner wall of the outer sleeve 42. The retaining portion 71 can hold the end portion of spool tube 51, which is opposite to the spool bottom 53. In this way, removable of the spool 50 toward the side away from the sleeve bottom 412 is limited.

The spool 50 forms a variable volume space 401 between the spool cover 52 and the sleeve bottom 412 at the inside space 400 of the sleeve 40. A volume of the variable volume space 401 varies when the spool 50 is moved in the axial direction.

A spring 72 is installed between the spool cover 52 and the sleeve bottom 412. The spring 72 urges the spool 50 toward the retaining portion 71. In this way, the spool 50 is urged against the retaining portion 71.

A linear solenoid 9 is located on the opposite side of the spool 50, which is opposite to the camshaft 3. When the linear solenoid 9 is energized, the linear solenoid 9 urges the spool 50 toward the camshaft 3 against the urging force of the spring 72. As a result, the position of the spool 50 changes in the axial direction relative to the sleeve 40. A movable range of the spool 50 extends from a position, at which the spool 50 contacts the retaining portion 71, to a position, at which the spool 50 contacts the sleeve bottom 412.

The supply passages 54 are communicated with the supply ports 43 regardless of the axial position of the spool 50 relative to the sleeve 40.

When the spool 50 is positioned to contact the retaining portion 71, the primary control passages 55 are communicated with the primary control ports 44, and the secondary control ports 45 are communicated with the recycle passages 57. In this way, the oil pump 8 is connected to the retard chambers 201, and the advance chambers 202 are connected to the recycle passages 57.

When the spool 50 is positioned to contact the sleeve bottom 412, the secondary control passages 56 are communicated with the secondary control ports 45, and the primary control ports 44 are communicated with the recycle passages 57. In this way, the oil pump 8 is connected to the advance chambers 202, and the retard chambers 201 are connected to the recycle passages 57.

When the spool 50 is placed at an intermediate position between the retaining portion 71 and the sleeve bottom 412, the communications of the primary control passages 55, the recycle passages 57 and the secondary control passages 56 to the primary control ports 44 and the secondary control ports 45 are blocked. In this way, both of the retard chambers 201 and the advance chambers 202 are closed.

Figure 4A:
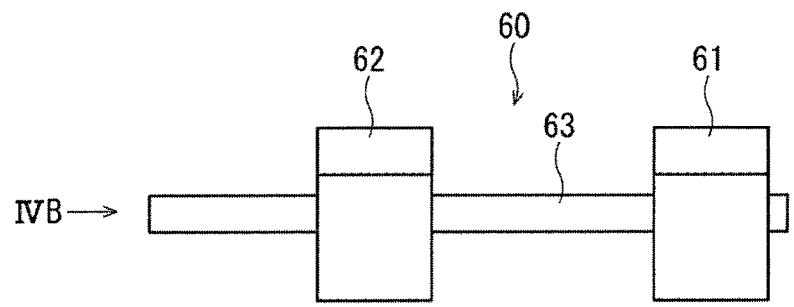
FIG. 4A is a diagram illustrating a check valve of the valve timing adjustment device according to the first embodiment of the present disclosure.
Figure 4B:
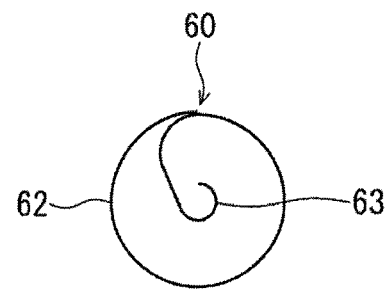
FIG. 4B is a view taken in a direction of an arrow IVB in FIG. 4A.
Figure 4C:
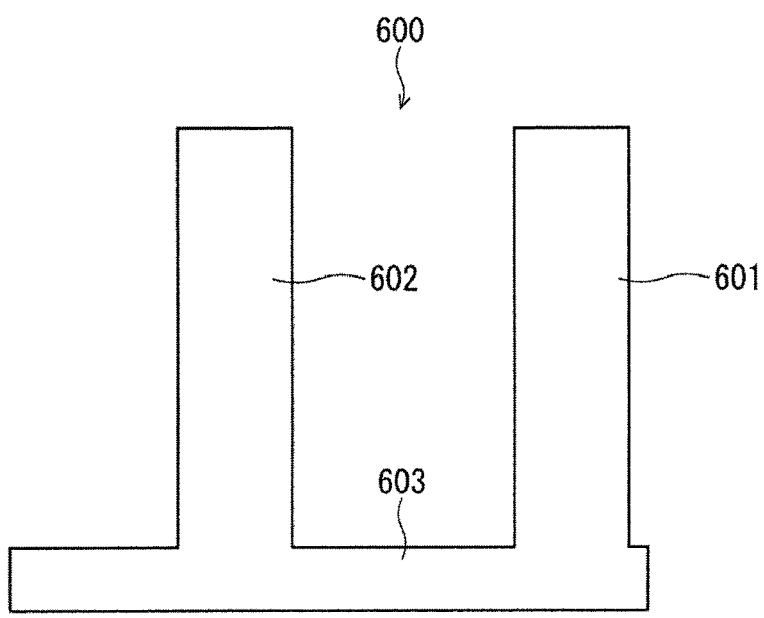
FIG. 4C is a developed view of the check valve.

As illustrated in FIGS. 4A to 4C, the check valve 60 has a supply check valve 61, a recycle check valve 62, and a shaft 63.

The check valve 60 is formed, for example, by rolling a thin plate 600 made of metal as illustrated in FIG. 4C. The thin plate 600 has a supply check valve corresponding portion 601, a recycle check valve corresponding portion 602, and a shaft corresponding portion 603. The supply check valve corresponding portion 601, the recycle check valve corresponding portion 602, and the shaft corresponding portion 603 are respectively shaped in a rectangular plate form. The supply check valve corresponding portion 601 and the recycle check valve corresponding portion 602 are formed integrally with the shaft corresponding portion 603 in one piece such that each of the supply check valve corresponding portion 601 and the recycle check valve corresponding portion 602 projects from one of two long sides of the shaft corresponding portion 603 in a transverse direction that is perpendicular to a longitudinal direction of the shaft corresponding portion 603. The check valve 60 is formed by rolling the shaft corresponding portion 603, the supply check valve corresponding portion 601 and the recycle check valve corresponding portion 602 in the transverse direction of the shaft corresponding portion 603.

The shaft 63 is shaped in a substantially cylindrical tubular form (see FIGS. 4A and 4B). The shaft 63 is formed such that the plate material, i.e., the shaft corresponding portion 603, does not have an overlapping portion, in which a part of the shaft corresponding portion 603 overlaps with another part of the shaft corresponding portion 603 in the circumferential direction.

The supply check valve 61 radially outwardly extends from the shaft 63 at a location around one end portion of the shaft 63 such that the supply check valve 61 is wound all around the shaft 63 and is thereby shaped in a substantially cylindrical tubular form (see FIGS. 4A and 4B). In this way, the supply check valve 61 is formed such that the supply check valve 61 is resiliently deformable in the radial direction. When the supply check valve 61 is radially inwardly deformed, an outer diameter of the supply check valve 61 is reduced. More specifically, the supply check valve 61 has an overlapping portion, in which a part of the plate material, i.e., the supply check valve corresponding portion 601 overlaps with another part of the supply check valve corresponding portion 601 in the circumferential direction. When a size of this overlapping portion is increased, it is radially inwardly deformed and thereby shrinks in the radial direction. In contrast, when the size of this overlapping portion is reduced, it is radially outwardly deformed and thereby expands in the radial direction. A space, which is formed at the inside of the supply check valve 61 shaped in the substantially cylindrical tubular form, is opened in the axial direction of the check valve 60.

The recycle check valve 62 radially outwardly extends from the shaft 63 such that the recycle check valve 62 is wound all around the shaft 63 and is thereby shaped in a substantially cylindrical tubular form (see FIGS. 4A and 4B). In this way, the recycle check valve 62 is formed such that the recycle check valve 62 is resiliently deformable in the radial direction. When the recycle check valve 62 is radially inwardly deformed, an outer diameter of the recycle check valve 62 is reduced. More specifically, the recycle check valve 62 has an overlapping portion, in which a part of the plate material, i.e., the recycle check valve corresponding portion 602 overlaps with another part of the recycle check valve corresponding portion 602 in the circumferential direction (see FIG. 3B). When a size of this overlapping portion is increased, it is radially inwardly deformed and thereby shrinks in the radial direction. In contrast, when the size of this overlapping portion is reduced, it is radially outwardly deformed and thereby expands in the radial direction. A space, which is formed at the inside of the recycle check valve 62 shaped in the substantially cylindrical tubular form, is opened in the axial direction of the check valve 60.

The check valve 60 is installed at the pressure accumulation space 500 such that the supply check valve 61 corresponds to the supply passages 54, and the recycle check valve 62 corresponds to the recycle passages 57 (see FIG. 1). The shaft 63 is positioned between the spool cover 52 and the spool bottom 53 and supports the supply check valve 61 and the recycle check valve 62.

When the hydraulic oil flows from the supply passages 54 toward the pressure accumulation space 500, an outer peripheral surface of the supply check valve 61 is radially inwardly urged by the hydraulic oil. Thus, the supply check valve 61 is radially inwardly deformed and is opened. Thereby, a gap is formed between the inner wall of the spool 50 and the supply check valve 61. As a result, the hydraulic oil can flow into the pressure accumulation space 500 through the supply passages 54. In contrast, when the hydraulic oil flows from the pressure accumulation space 500 toward the supply passages 54, an inner peripheral surface of the supply check valve 61 is radially outwardly urged by the hydraulic oil. Thus, the supply check valve 61 is radially outwardly deformed and is thereby closed. Thereby, the supply check valve 61 is urged against the inner wall of the spool 50 to close the supply passages 54. In this way, the outflow of the hydraulic oil from the pressure accumulation space 500 to the outside of the spool 50 through the supply passages 54 is limited. Thus, the supply check valve 61 enables the flow of the hydraulic oil from the supply passages 54 to the pressure accumulation space 500 and limits the flow of the hydraulic oil from the pressure accumulation space 500 to the supply passages 54.

When the hydraulic oil flows from the recycle passages 57 toward the pressure accumulation space 500, an outer peripheral surface of the recycle check valve 62 is radially inwardly urged by the hydraulic oil. Thus, the recycle check valve 62 is radially inwardly deformed and is opened. Thereby, a gap is formed between the inner wall of the spool 50 and the recycle check valve 62. In this way, the hydraulic oil can flow into the pressure accumulation space 500 through the recycle passages 57. In contrast, when the hydraulic oil flows from the pressure accumulation space 500 toward the recycle passages 57, an inner peripheral surface of the recycle check valve 62 is radially outwardly urged by the hydraulic oil. Thus, the recycle check valve 62 is radially outwardly deformed and is thereby closed. Thereby, the recycle check valve 62 is urged against the inner wall of the spool 50 to close the recycle passages 57. In this way, the outflow of the hydraulic oil from the pressure accumulation space 500 to the outside of the spool 50 through the recycle passages 57 is limited. Thus, the recycle check valve 62 enables the flow of the hydraulic oil from the recycle passages 57 to the pressure accumulation space 500 and limits the flow of the hydraulic oil from the pressure accumulation space 500 to the recycle passages 57.

In the present embodiment, the sleeve 40 further includes a breathing hole 402.

Figure 3:
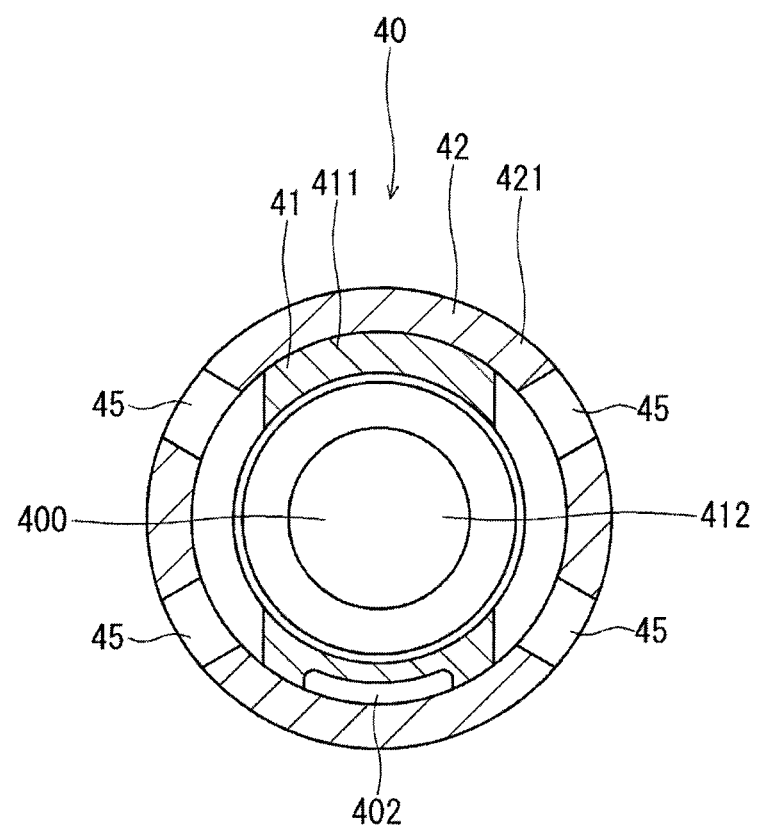
FIG. 3 is a cross-sectional view taken along line III-III in FIG. 1 and illustrating only a sleeve.

The breathing hole 402 is radially inwardly recessed from the outer wall of the inner sleeve 41 and extends in the axial direction of the inner sleeve 41 (see FIGS. 1 and 3). Specifically, the breathing hole 402 is formed between the inner sleeve 41 and the outer sleeve 42 on the outer side of the inside space 400. Specifically, the breathing hole 402 and the inside space 400 are partitioned by the inner sleeve 41, which is a portion of the sleeve 40.

The breathing hole 402 enables communication between the variable volume space 401 and the outside (i.e., the atmosphere) of the valve timing adjustment device 10, which is a space opposite to the variable volume space 401 of the sleeve 40. As a result, the pressure in the variable volume space 401 can be made equal to the atmospheric pressure.

The passage change valve 11 is operable among a first operating state, a second operating state and a holding state by urging the spool 50 through the operation of the linear solenoid 9. In the first operating state, the oil pump 8 is connected to the retard chambers 201, and the advance chambers 202 are connected to the recycle passages 57. In the second operating state, the oil pump 8 is connected to the advance chambers 202, and the retard chambers 201 are connected to the recycle passages 57. In the holding state, the retard chambers 201 and the advance chambers 202 are both closed. In the first operating state, the hydraulic oil is supplied to the retard chambers 201, and the hydraulic oil is returned from the advance chambers 202 to the pressure accumulation space 500. In the second operating state, the hydraulic oil is supplied to the advance chambers 202, and the hydraulic oil is returned from the retard chambers 201 to the pressure accumulation space 500. In the holding state, the hydraulic oil in the retard chambers 201 and the hydraulic oil in the advance chambers 202 are retained.

Figure 2:
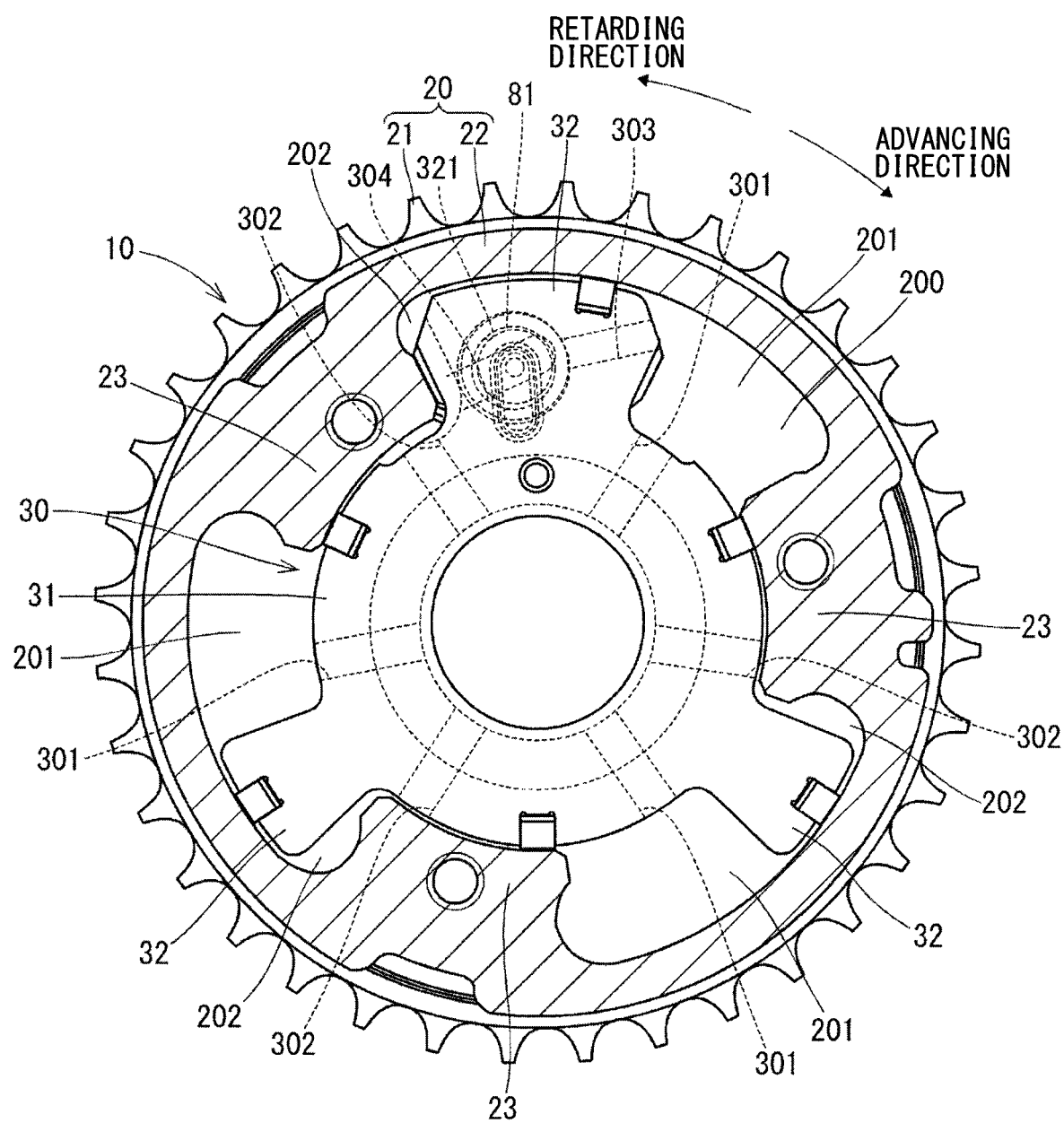
FIG. 2 is a cross-sectional view taken along line II-II in FIG. 1 and illustrating only a housing and a vane rotor.

The present embodiment is further provided with a lock pin 81 (see FIGS. 1 and 2). The lock pin 81 is shaped in a bottomed cylindrical tubular form. The lock pin 81 is received in a receiving hole 321 formed at the vane 32 in such a manner that the lock pin 81 can axially reciprocate in the receiving hole 321. A spring 82 is installed in an inside of the lock pin 81. The spring 82 urges the lock pin 81 toward the sprocket 21. A fitting recess 25 is formed at the sprocket 21 on the vane 32 side of the sprocket 21.

The lock pin 81 can be fitted into the fitting recess 25 when the vane rotor 30 is held at a most retarded position relative to the housing 20. When the lock pin 81 is fitted into the fitting recess 25, relative rotation of the vane rotor 30 relative to the housing 20 is limited. On the other hand, when the lock pin 81 is not fitted into the fitting recess 25, the relative rotation of the vane rotor 30 relative to the housing 20 is enabled.

A pin control passage 303, which is communicated with a corresponding one of the retard chambers 201, is formed in the vane 32 at a location between the lock pin 81 and the retard chamber 201. Furthermore, a pin control passage 304, which is communicated with a corresponding one of the advance chambers 202, is formed in the vane 32 at a location between the lock pin 81 and the advance chamber 202 (see FIG. 2). The pressure of the hydraulic oil, which flows from the retard chamber 201 or the advance chamber 202 into the pin control passage 303, 304, is exerted in a removing direction for removing the lock pin 81 from the fitting recess 25 against the urging force of the spring 82.

In the valve timing adjustment device 10 constructed in the above-described manner, when the hydraulic oil is supplied to the retard chambers 201 or the advance chambers 202, the hydraulic oil flows into the pin control passage 303, 304. Thereby, the lock pin 81 is removed from the fitting recess 25, and thereby the relative rotation of the vane rotor 30 relative to the housing 20 is enabled.

The valve timing adjustment device 10 brings the passage change valve 11 into the first operating state when the rotational phase of the camshaft 3 is on the advance side of a target value. As a result, the vane rotor 30 undergoes relative rotation in the retarding direction relative to the housing 20, so that the rotational phase of the camshaft 3 shifts to the retard side.

The valve timing adjustment device 10 brings the passage change valve 11 into the second operating state when the rotational phase of the camshaft 3 is on the retard side of the target value. As a result, the vane rotor 30 undergoes relative rotation in the advancing direction relative to the housing 20, so that the rotational phase of the camshaft 3 shifts to the advance side.

The valve timing adjustment device 10 brings the passage change valve 11 into the holding state when the rotational phase of the camshaft 3 coincides with the target value. In this way, the rotational phase of the camshaft 3 is maintained.

In the present embodiment, the pressure of the variable volume space 401 is kept substantially equal to the atmospheric pressure through the breathing hole 402. Therefore, when the spool 50 is urged by the linear solenoid 9, the spool 50 can be smoothly reciprocated in the axial direction at the inside of the sleeve 40. When the hydraulic oil is accumulated in the variable volume space 401, the hydraulic oil flows to the outside (i.e., the atmosphere) of the valve timing adjustment device 10, which is the space located on the side of the passage change valve 11 that is opposite to the camshaft 3, through the breathing hole 402, and the hydraulic oil is then returned to the oil pan 7.

As described above, according to the present embodiment, there is provided the valve timing adjustment device 10 that is installed in the drive force transmission path for transmitting the drive force from the crankshaft 2 to the camshaft 3 of the engine 1 and adjusts the valve timing of the intake valves 4 that are driven to open and close by the camshaft 3. The valve timing adjustment device 10 includes the housing 20, the vane rotor 30, the sleeve 40 and the spool 50.

The housing 20 is rotated synchronously with the crankshaft 2 and is fitted to the end portion of the camshaft 3 such that the housing 20 is rotatably supported by the camshaft 3.

The vane rotor 30 is fixed to the end portion of the camshaft 3. The vane rotor 30 includes the vanes 32, each of which partitions the inside space 200 of the housing 20 into the retard chamber 201, which is located on one side of the vane 32 in the circumferential direction, and the advance chamber 202, which is located on the other side of the vane 32 in the circumferential direction. The vane rotor 30 is rotated relative to the housing 20 depending on the pressure of hydraulic oil supplied from the oil pump 8 to the retard chambers 201 and the advance chambers 202.

The sleeve 40 includes: the sleeve tubes 411, 421; the sleeve bottom 412, which closes the end portion of the sleeve tube 411 located on the camshaft 3 side; the inside space 400, which is formed at the inside of the sleeve tubes 411, 421; the supply ports 43, which are communicated with the oil pump 8; the primary control ports 44, which are communicated with the retard chambers 201; and the secondary control ports 45, which are communicated with the advance chambers 202.

The spool 50 includes: the spool tube 51, which is configured to reciprocate in the axial direction at the inside space 400 of the sleeve 40; the spool cover 52, which closes the end portion of the spool tube 51 located on the camshaft 3 side; the pressure accumulation space 500, which is formed at the inside of the spool tube 51; the supply passages 54, which are configured to connect the pressure accumulation space 500 to the supply ports 43; the primary control passages 55, which are configured to connect the pressure accumulation space 500 to the primary control ports 44; the secondary control passages 56, which are configured to connect the pressure accumulation space 500 to the secondary control ports 45; and the variable volume space 401, which has a variable volume and is located between the spool cover 52 and the sleeve bottom 412.

In the present embodiment, the sleeve 40 includes the breathing hole 402 at the outside of the inside space 400 while the breathing hole 402 is a hole that communicates the variable volume space 401 to the atmosphere. The pressure of the variable volume space 401 can be made equal to the atmospheric pressure through the breathing hole 402. Therefore, the spool 50 can smoothly reciprocate in the axial direction at the inside of the sleeve 40. In this way, the responsiveness of the valve timing adjustment device 10 can be improved.

Furthermore, in the present embodiment, the pressure accumulation space 500 is formed at the inside of the spool tube 51, and the breathing hole 402 is formed at the outside of the inside space 400 of the sleeve 40. Specifically, in the present embodiment, the breathing hole 402 is formed at the outside of the spool 50. Therefore, the partitioning member, which partitions the space at the inside of the spool 50 into the pressure accumulation space 500 and the breathing hole 402, is not placed at the inside of the spool 50 unlike the previously proposed technique. Thus, the hydraulic oil will not leak from the pressure accumulation space 500 to the breathing hole 402 at the inside of the spool 50. Thereby, it is possible to limit a decrease in the pressure of the hydraulic oil to be supplied to the retard chambers 201 or the advance chambers 202. In this way, the responsiveness of the valve timing adjustment device 10 can be further improved.

Furthermore, in the present embodiment, the sleeve 40 includes: the inner sleeve 41, which is shaped in the tubular form; and the outer sleeve 42, which is shaped in the tubular form and is placed at the outside of the inner sleeve 41. The breathing hole 402 is formed between the inner sleeve 41 and the outer sleeve 42. Therefore, the breathing hole 402 can be more easily formed in comparison to the case where the breathing hole 402 is formed at the sleeve 40 that has the inner sleeve 41 and the outer sleeve 42, which are integrally formed.

Furthermore, in the present embodiment, the hardness of the inner sleeve 41 is lower than the hardness of the outer sleeve 42. Therefore, the breathing hole 402 can be relatively easily formed at the inner sleeve 41.

Furthermore, in the present embodiment, the breathing hole 402 is formed at the sleeve tube 411 such that the breathing hole 402 extends in the axial direction of the sleeve 40. In this way, the variable volume space 401 can be opened to the atmosphere that is located on the side of the passage change valve 11, which is opposite to the camshaft 3.

Furthermore, in the present embodiment, the spool 50 further includes the recycle passages 57. The recycle passages 57 are configured to connect the pressure accumulation space 500 to the primary control ports 44 or the secondary control ports 45. Furthermore, the present embodiment is provided with the recycle check valve 62. The recycle check valve 62 is installed at the inside of the spool 50. The recycle check valve 62 enables the flow of the hydraulic oil from the recycle passages 57 to the pressure accumulation space 500 and limits the flow of the hydraulic oil from the pressure accumulation space 500 to the recycle passages 57. In this way, the hydraulic oil in the retard chambers 201 or the advance chambers 202 can be returned to the pressure accumulation space 500, and thereby the responsiveness of the valve timing adjustment device 10 can be further improved.

Moreover, in the present embodiment, the sleeve 40 is placed at the center of the vane rotor 30. Specifically, in the present embodiment, the sleeve 40 and the spool 50 of the passage change valve 11 are placed at the center of the vane rotor 30. In this way, a length of each oil path, which extends from the passage change valve 11 to the corresponding retard chambers 201 or advance chambers 202, can be made short, and thereby the responsiveness of the valve timing adjustment device 10 can be further improved.

Furthermore, in the present embodiment, the sleeve 40 has the threaded portion 422 that is formed at the end portion of the sleeve 40 located on the sleeve bottom 412 side. The threaded portion 422 is configured to threadably engage with the shaft-side threaded portion 110 that is formed at the camshaft 3. When the threaded portion 422 is threadably engaged with the shaft-side threaded portion 110, the vane rotor 30 is fixed to the camshaft 3. Therefore, it is possible to eliminate a member for fixing the vane rotor 30 to the camshaft 3 in a state where the passage change valve 11 is placed at the center of the vane rotor 30.

Second Embodiment

Figure 5:
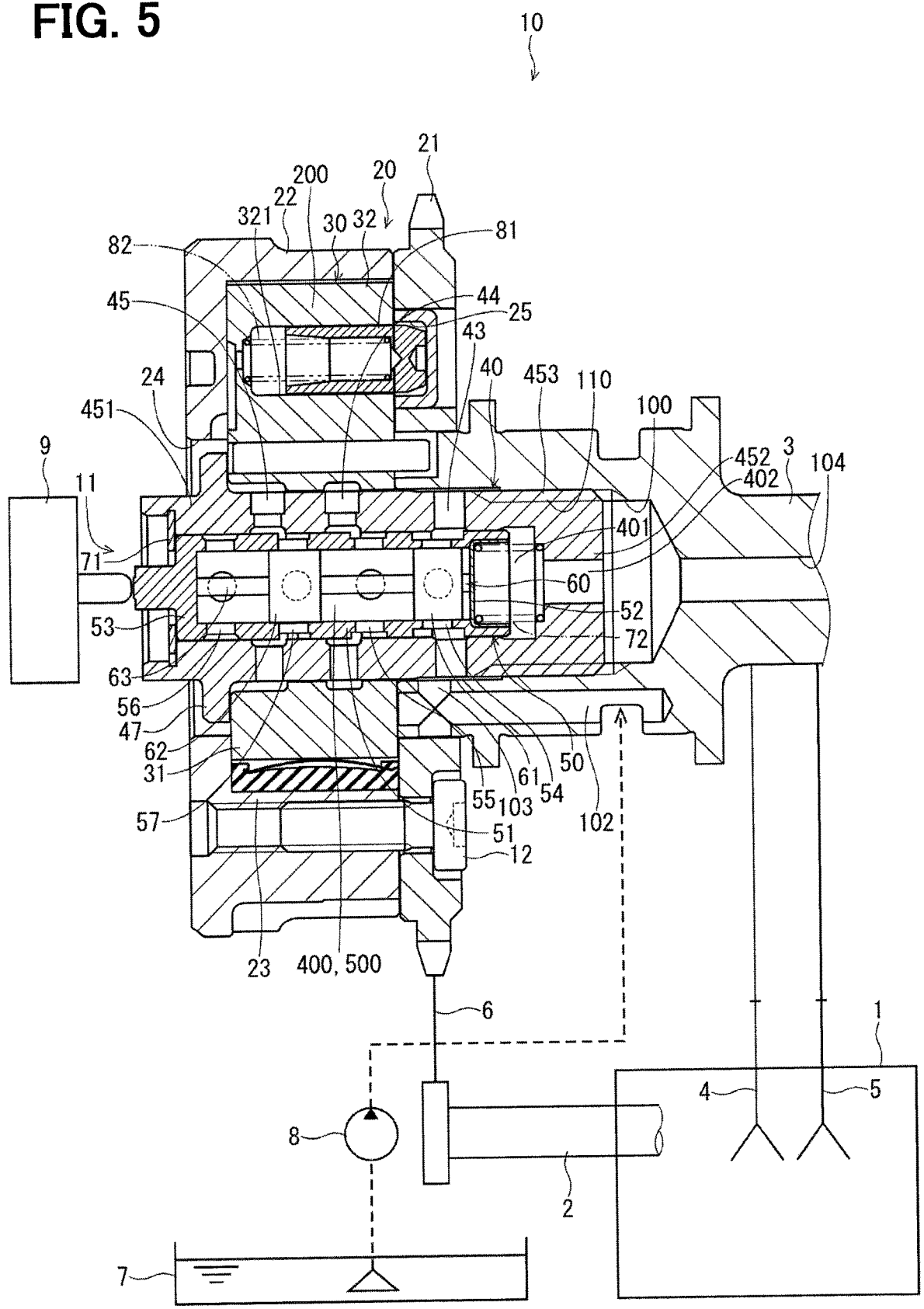
FIG. 5 is a cross-sectional view illustrating a valve timing adjustment device according to a second embodiment of the present disclosure.

FIG. 5 illustrates a valve timing adjustment device according to a second embodiment of the present disclosure. The second embodiment differs from the first embodiment with respect to the configurations of the sleeve 40 and the camshaft 3.

In the second embodiment, the sleeve 40 is made of metal, such as iron. The sleeve 40 has a sleeve tube 451, a sleeve bottom 452, and a threaded portion 453.

The sleeve tube 451 is shaped in a substantially cylindrical tubular form. The sleeve bottom 452 is integrally formed with the sleeve tube 451 in one piece such that the sleeve bottom 452 closes one end portion of the sleeve tube 451. The threaded portion 453 is formed at an outer wall of the end portion of the sleeve tube 451, which is located on the sleeve bottom 452 side.

The sleeve 40 is inserted through the inside of the boss 31 of the vane rotor 30 and is fixed to the camshaft 3 such that the threaded portion 453 of the sleeve 40 is engaged with the shaft-side threaded portion 110 of the camshaft 3.

The breathing hole 402 extends through the center of the sleeve bottom 452 in the plate thickness direction of the sleeve bottom 452. Specifically, the breathing hole 402 is formed at the sleeve bottom 452 such that the breathing hole 402 extends in the axial direction of the sleeve 40.

Supply holes 102, 103 are formed at the camshaft 3. The supply hole 102 is formed such that the supply hole 102 is located on the radially outer side of the shaft hole 100 and extends in the axial direction of the camshaft 3. The supply hole 103 is formed such that the supply hole 103 connects between the supply hole 102 and the shaft hole 100. The oil pump 8 is connected to an end portion of the supply hole 102, which is opposite to the supply hole 103. In this way, the hydraulic oil is supplied from the oil pump 8 to the pressure accumulation space 500 through the supply holes 102, 103, the supply ports 43 and the supply passages 54.

The camshaft 3 has an axial hole 104. The axial hole 104 is formed such that the axial hole 104 extends from the shaft hole 100 in the axial direction of the camshaft 3. The axial hole 104 is communicated with the outside of the camshaft 3. In this way, the variable volume space 401 is communicated with the outside of the valve timing adjustment device 10, which is the outside of the camshaft 3, through the breathing hole 402, the shaft hole 100 and the axial hole 104, that is, the variable volume space 401 is communicated with the atmosphere through the breathing hole 402, the shaft hole 100 and the axial hole 104.

Other than the points described above, the structure of the second embodiment is the same as that of the first embodiment. Therefore, the structure, which is the same as the structure of the first embodiment, can achieve the same advantages as those of the first embodiment.

As described above, the breathing hole 402 is formed at the sleeve bottom 452 such that the breathing hole 402 extends in the axial direction of the sleeve 40. In this way, the variable volume space 401 can be opened to the atmosphere that is located on the side of the passage change valve 11, which is on the camshaft 3 side.

Third Embodiment

Figure 6:
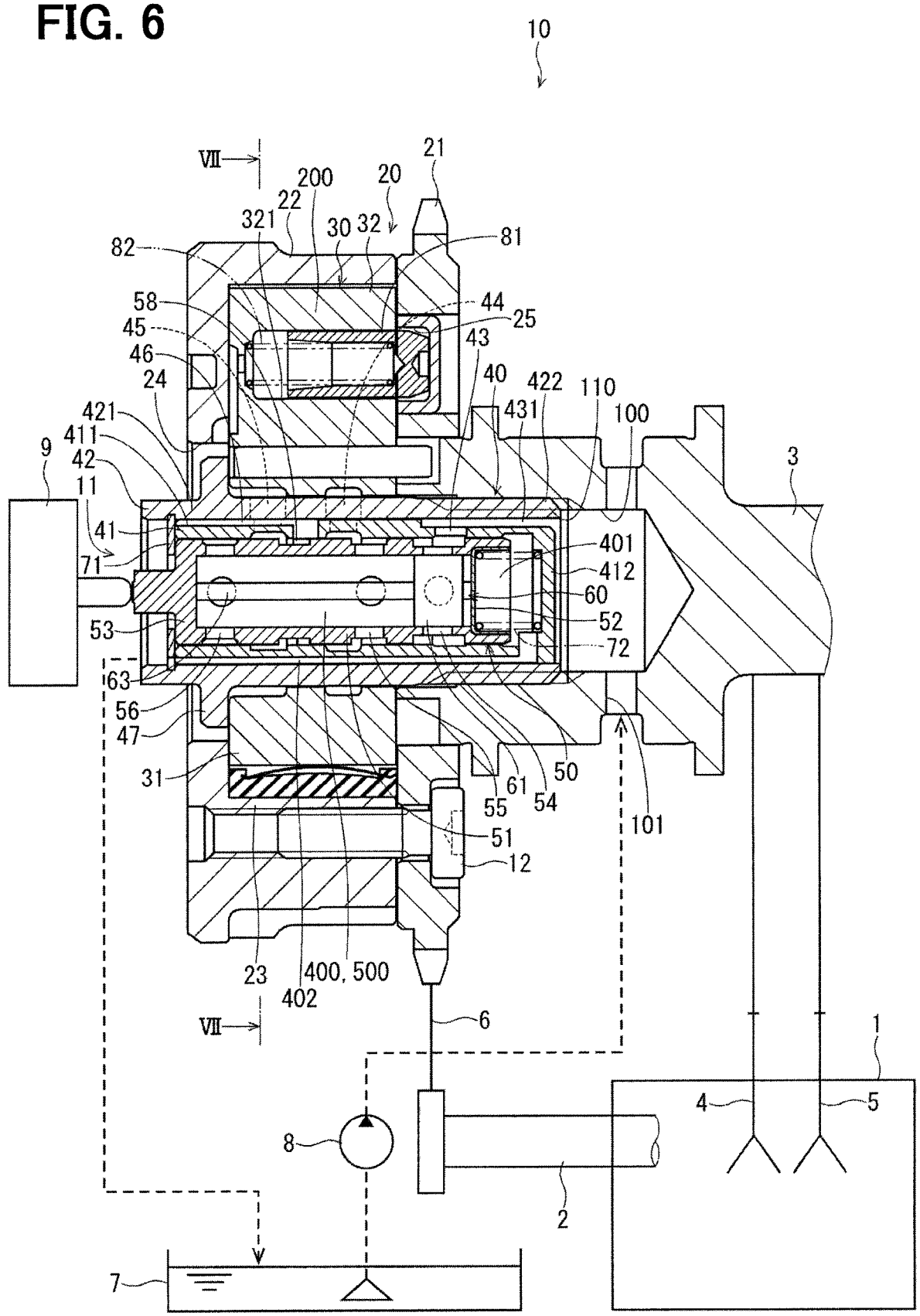
FIG. 6 is a cross-sectional view illustrating a valve timing adjustment device according to a third embodiment of the present disclosure.

FIG. 6 illustrates a valve timing adjustment device according to a third embodiment of the present disclosure. The third embodiment differs from the first embodiment with respect to the configurations of the sleeve 40, the spool 50, and the check valve 60.

In the third embodiment, the sleeve 40 also has a drain port 46.

Figure 7:
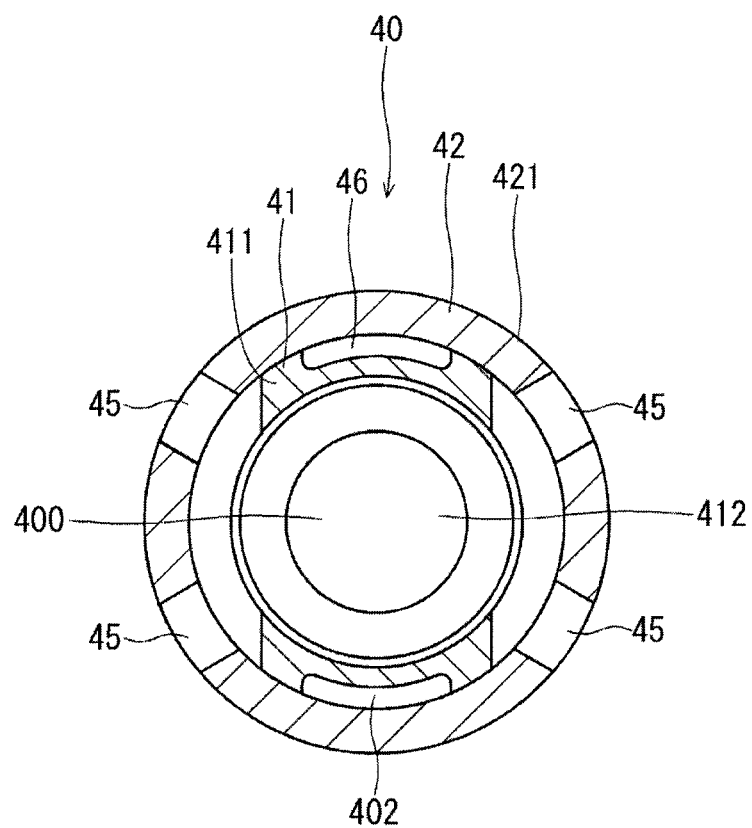
FIG. 7 is a cross-sectional view taken along line VII-VII in FIG. 6 and illustrating only a sleeve.

The drain port 46 is radially inwardly recessed from the outer wall of the inner sleeve 41 at a location that is on a side of the axis of the sleeve 40, which is diametrically opposite to the breathing hole 402, and the drain port 46 extends in the axial direction of the inner sleeve 41 (see FIGS. 6 and 7). Specifically, the drain port 46 is formed between the inner sleeve 41 and the outer sleeve 42 at the location that is on the outer side of the inside space 400. The drain port 46 is communicated with the outside of the valve timing adjustment device 10 that is a space on the opposite side of the passage change valve 11, which is opposite to the camshaft 3, that is, the drain port 46 is communicated with the atmosphere.

The spool 50 has a drain passage 58. The drain passage 58 is located between the primary control passages 55 and the secondary control passages 56 and is radially inwardly recessed from the outer wall of the spool tube 51. When the spool 50 is positioned to contact the retaining portion 71, the secondary control ports 45 are communicated with the drain passage 58 and is thereby communicated with the outside of the valve timing adjustment device 10 through the drain passage 58 and the drain port 46, that is, the secondary control ports 45 are communicated with the atmosphere through the drain passage 58 and the drain port 46. In this way, the hydraulic oil of the advance chambers 202 is discharged through the drain port 46 and is returned to the oil pan 7. In contrast, when the spool 50 is positioned to contact the sleeve bottom 412, the primary control ports 44 are communicated with the drain passage 58 and is thereby communicated with the outside of the valve timing adjustment device 10 through the drain passage 58 and the drain port 46, that is, the primary control ports 44 are communicated with the atmosphere through the drain passage 58 and the drain port 46. In this way, the hydraulic oil of the retard chambers 201 is discharged through the drain port 46 and is returned to the oil pan 7. As discussed above, the drain passage 58 is configured to connect the primary control ports 44 or the secondary control ports 45 to the drain port 46.

In the present embodiment, the spool 50 does not have the recycle passage 57. Furthermore, the check valve 60 does not have the recycle check valve 62.

Other than the points described above, the structure of the third embodiment is similar to the structure of the first embodiment. Therefore, the structure, which is the same as the structure of the first embodiment, can achieve the same advantages as those of the first embodiment.

As discussed above, in the present embodiment, the sleeve 40 has the drain port 46 that is communicated with the outside of the valve timing adjustment device 10. The spool 50 has the drain passage 58 that is configured to connect the primary control ports 44 or the secondary control ports 45 to the drain port 46. In this way, at the time of operating the valve timing adjustment device 10, the hydraulic oil of the advance chambers 202 or the retard chambers 201 can be discharged to the outside of the valve timing adjustment device 10 through the drain passage 58 and the drain port 46.

Fourth Embodiment

Figure 8:
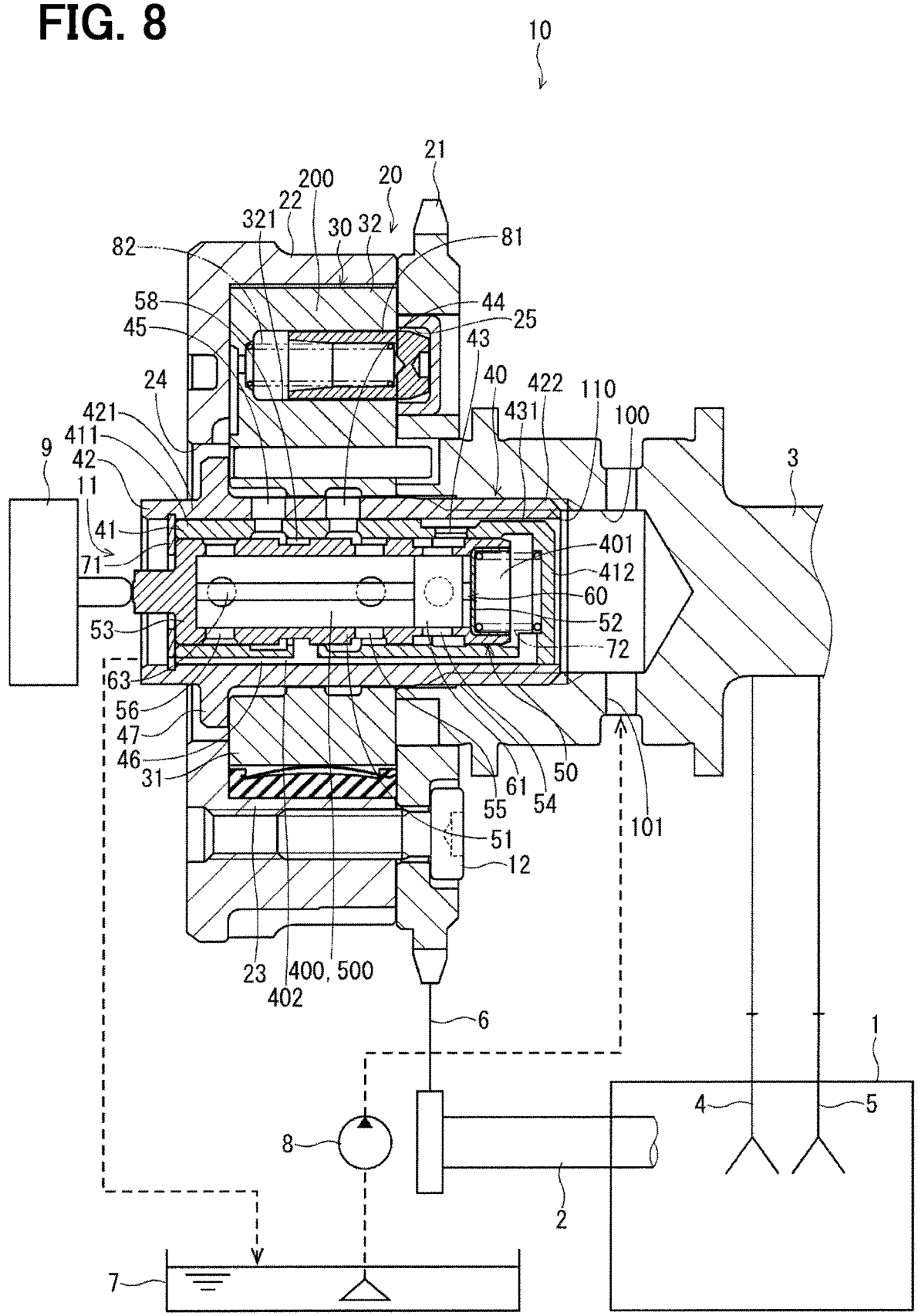
FIG. 8 is a cross-sectional view illustrating a valve timing adjustment device according to a fourth embodiment of the present disclosure.

FIG. 8 illustrates a valve timing adjustment device according to a fourth embodiment of the present disclosure. The fourth embodiment differs from the third embodiment with respect to the configuration of the sleeve 40.

In the fourth embodiment, the drain port 46 is formed integrally with the breathing hole 402 (see FIG. 8). More specifically, the drain port 46 is formed integrally with an end portion of the breathing hole 402 located on the linear solenoid 9 side.

Other than the point described above, the structure of the fourth embodiment is similar to the structure of the third embodiment. Therefore, the structure, which is the same as the structure of the third embodiment, can achieve the same advantages as those of the third embodiment.

As described above, in the present embodiment, the drain port 46 is formed integrally with the breathing hole 402. Therefore, in comparison to the case where the drain port 46 is formed at the different location that is different from the location of the breathing hole 402, the processing costs can be reduced.

Other Embodiments

The above embodiments illustrate the example in which the sleeve 40 and the spool 50 of the passage change valve 11 are placed at the center of the vane rotor 30. In another embodiment of the present disclosure, the passage change valve 11 may be placed at a location, such as the outside of the housing 20, which is other than the center of the vane rotor 30.

Furthermore, in another embodiment of the present disclosure, the inner sleeve 41 may be made of, for example, resin or the like. Furthermore, the hardness of the inner sleeve 41 may be set to be equal to or higher than the hardness of the outer sleeve 42.

Furthermore, in another embodiment of the present disclosure, the spool cover 52 may not be formed integrally with the spool tube 51. Furthermore, the spool cover 52 may be formed such that the spool cover 52 closes an opposite end portion of the spool tube 51, which is opposite from the camshaft 3. Furthermore, the spool bottom 53 may be formed separately from the spool tube 51.

The above embodiments illustrate the primary control passages 55, which are connectable to the primary control ports, and the secondary control passages 56, which are connectable to the secondary control ports, as the control passages formed at the spool 50. In another embodiment of the present disclosure, a common control passage(s), which is connectable to the primary control ports and the secondary control ports, may be formed at the spool 50. In this case, a drain passage connected to each of the control ports may be formed at the spool.

In the first, third and fourth embodiments, the sleeve 40 is configured in the double-tube form that includes the inner sleeve 41 and the outer sleeve 42, and the breathing hole 402 is formed between the inner sleeve 41 and the outer sleeve 42. Alternatively, in another embodiment of the present disclosure, the sleeve 40 may be configured in the single-tube form like in the second embodiment, and the breathing hole 402 may be formed in a range of a wall thickness of the sleeve tube 451 of the sleeve 40. In such a case, the breathing hole 402 and the inside space 400 are partitioned by a portion of the sleeve 40 (a portion of the sleeve tube 451).

Furthermore, in another embodiment of the present disclosure, the housing 20 and the crankshaft 2 may be connected by a transmission member, such as a belt, in place of the chain 6.

The above embodiments illustrate the example, in which the crankshaft 2 serves as the first shaft, and the camshaft 3 serves as the second shaft. In another embodiment of the present disclosure, the crankshaft 2 may serve as the second shaft, and the camshaft 3 may serve as the first shaft. Specifically, the vane rotor 30 may be fixed to the end portion of the crankshaft 2, and the housing 20 may be rotated synchronously with the camshaft 3.

The valve timing adjustment device 10 of the present disclosure may adjust the valve timing of the exhaust valves 5 of the engine 1.

As discussed above, the present disclosure is not limited to the above embodiments and can be implemented in various forms without departing from the scope thereof.

The present disclosure has been described with reference to the embodiments. However, the present disclosure should not be limited to the embodiments and the structures described therein. The present disclosure covers various modifications and variations on the scope of equivalents. Also, various combinations and forms as well as other combinations, each of which includes only one element or more or less of the various combinations, are also within the scope and spirit of the present disclosure.

What is claimed is:

1. A valve timing adjustment device that is configured to be installed in a drive force transmission path for transmitting a drive force from a drive shaft to a driven shaft of an internal combustion engine and is configured to adjust a valve timing of a valve that is driven to open and close by the driven shaft, wherein one of the drive shaft and the driven shaft is defined as a first shaft while the other one of the drive shaft and the driven shaft is defined as a second shaft, the valve timing adjustment device comprising:
   a housing that is configured to be rotated synchronously with the first shaft, wherein the housing is configured to be fitted to an end portion of the second shaft and is configured to be rotatably supported by the second shaft;
   a vane rotor that is configured to be fixed to the end portion of the second shaft and includes a vane that partitions an inside space of the housing into a primary hydraulic chamber and a secondary hydraulic chamber while the primary hydraulic chamber is located on one side of the vane in a circumferential direction, and the secondary hydraulic chamber is located on the other side of the vane in the circumferential direction, wherein the vane rotor is configured to be rotated relative to the housing depending on a pressure of hydraulic oil supplied from a hydraulic oil supply source to the primary hydraulic chamber and a pressure of the hydraulic oil supplied from the hydraulic oil supply source to the secondary hydraulic chamber;
a sleeve that includes:
  a sleeve tube;
  a sleeve bottom that closes an end portion of the sleeve tube;
  an inside space that is formed at an inside of the sleeve tube;
  a supply port that is communicated with the hydraulic oil supply source;
  a primary control port that is communicated with the primary hydraulic chamber; and
  a secondary control port that is communicated with the secondary hydraulic chamber; and
a spool that includes:
  a spool tube that is installed at the inside space of the sleeve and is configured to reciprocate in an axial direction of the spool;
  a spool cover that closes an end portion of the spool tube;
  a pressure accumulation space that is formed at an inside of the spool tube;
  a supply passage that is configured to connect between the pressure accumulation space and the supply port; and
  a control passage that is configured to connect between the pressure accumulation space and the primary control port or the secondary control port, wherein:
the spool forms a variable volume space between the spool and the sleeve bottom while the variable volume space is a space, a volume of which is variable;
the sleeve includes a breathing hole that communicates between the variable volume space and an atmosphere and is located at an outside of the inside space of the sleeve;
the sleeve includes:
  an inner sleeve that is shaped in a tubular form, and
  an outer sleeve that is shaped in a tubular form and is placed at an outside of the inner sleeve, and
  the breathing hole is formed between the inner sleeve and the outer sleeve.

2. The valve timing adjustment device according to claim 1, wherein a hardness of the inner sleeve is lower than a hardness of the outer sleeve.

3. The valve timing adjustment device according to claim 1, wherein the breathing hole is formed at the sleeve tube such that the breathing hole extends in an axial direction of the sleeve.

4. The valve timing adjustment device according to claim 1, wherein:
the spool further includes a recycle passage that is configured to connect between the pressure accumulation space and the primary control port or the secondary control port; and
the valve timing adjustment device further comprises a recycle check valve that is placed at the inside of the spool, wherein the recycle check valve is configured to enable a flow of the hydraulic oil from the recycle passage toward the pressure accumulation space and is configured to limit a flow of the hydraulic oil from the pressure accumulation space toward the recycle passage.

5. The valve timing adjustment device according to claim 1, wherein:
the sleeve further includes a drain port that is communicated with an outside of the valve timing adjustment device; and
the spool further includes a drain passage that is configured to connect between the primary control port or the secondary control port and the drain port.

6. The valve timing adjustment device according to claim 5, wherein the drain port is formed integrally with the breathing hole.

7. The valve timing adjustment device according to claim 1, wherein the sleeve is placed at a center of the vane rotor.

8. The valve timing adjustment device according to claim 7, wherein:
the sleeve includes a threaded portion at an end portion of the sleeve located on the sleeve bottom side while the threaded portion is configured to be coupled with a shaft-side threaded portion formed at the second shaft; and
the vane rotor is configured to be fixed to the second shaft when the threaded portion of the sleeve is coupled with the shaft-side threaded portion.

9. A valve timing adjustment device that is configured to be installed in a drive force transmission path for transmitting a drive force from a drive shaft to a driven shaft of an internal combustion engine and is configured to adjust a valve timing of a valve that is driven to open and close by the driven shaft, wherein one of the drive shaft and the driven shaft is defined as a first shaft while the other one of the drive shaft and the driven shaft is defined as a second shaft, the valve timing adjustment device comprising:
a housing that is configured to be rotated synchronously with the first shaft, wherein the housing is configured to be fitted to an end portion of the second shaft and is configured to be rotatably supported by the second shaft;
a vane rotor that is configured to be fixed to the end portion of the second shaft and includes a vane that partitions an inside space of the housing into a primary hydraulic chamber and a secondary hydraulic chamber while the primary hydraulic chamber is located on one side of the vane in a circumferential direction, and the secondary hydraulic chamber is located on the other side of the vane in the circumferential direction, wherein the vane rotor is configured to be rotated relative to the housing depending on a pressure of hydraulic oil supplied from a hydraulic oil supply source to the primary hydraulic chamber and a pressure of the hydraulic oil supplied from the hydraulic oil supply source to the secondary hydraulic chamber;
a sleeve that includes:
  a sleeve tube;
  a sleeve bottom that closes an end portion of the sleeve tube;
  an inside space that is formed at an inside of the sleeve tube;
  a supply port that is communicated with the hydraulic oil supply source;
  a primary control port that is communicated with the primary hydraulic chamber; and
  a secondary control port that is communicated with the secondary hydraulic chamber; and a spool that includes:
- a spool tube that is installed at the inside space of the sleeve and is configured to reciprocate in an axial direction of the spool;
- a spool cover that closes an end portion of the spool tube;
- a pressure accumulation space that is formed at an inside of the spool tube;
- a supply passage that is configured to connect between the pressure accumulation space and the supply port; and
- a control passage that is configured to connect between the pressure accumulation space and the primary control port or the secondary control port, wherein:

the spool forms a variable volume space between the spool and the sleeve bottom while the variable volume space is a space, a volume of which is variable;

the sleeve includes a breathing hole that communicates between the variable volume space and an atmosphere and is located at an outside of the inside space of the sleeve;

the spool further includes a recycle passage that is configured to connect between the pressure accumulation space and the primary control port or the secondary control port; and the valve timing adjustment device further comprises a recycle check valve that is placed at the inside of the spool, wherein the recycle check valve is configured to enable a flow of the hydraulic oil from the recycle passage toward the pressure accumulation space and is configured to limit a flow of the hydraulic oil from the pressure accumulation space toward the recycle passage.

10. The valve timing adjustment device according to claim 9, wherein the breathing hole is formed at the sleeve bottom such that the breathing hole extends in an axial direction of the sleeve.

11. A valve timing adjustment device that is configured to be installed in a drive force transmission path for transmitting a drive force from a drive shaft to a driven shaft of an internal combustion engine and is configured to adjust a valve timing of a valve that is driven to open and close by the driven shaft, wherein one of the drive shaft and the driven shaft is defined as a first shaft while the other one of the drive shaft and the driven shaft is defined as a second shaft, the valve timing adjustment device comprising:

- a housing that is configured to be rotated synchronously with the first shaft, wherein the housing is configured to be fitted to an end portion of the second shaft and is configured to be rotatably supported by the second shaft;
- a vane rotor that is configured to be fixed to the end portion of the second shaft and includes a vane that partitions an inside space of the housing into a primary hydraulic chamber and a secondary hydraulic chamber while the primary hydraulic chamber is located on one side of the vane in a circumferential direction, and the secondary hydraulic chamber is located on the other side of the vane in the circumferential direction, wherein the vane rotor is configured to be rotated relative to the housing depending on a pressure of hydraulic oil supplied from a hydraulic oil supply source to the primary hydraulic chamber and a pressure of the hydraulic oil supplied from the hydraulic oil supply source to the secondary hydraulic chamber;

a sleeve that includes:
- a sleeve tube;
- a sleeve bottom that closes an end portion of the sleeve tube;
- an inside space that is formed at an inside of the sleeve tube;
- a supply port that is communicated with the hydraulic oil supply source;
- a primary control port that is communicated with the primary hydraulic chamber; and
- a secondary control port that is communicated with the secondary hydraulic chamber; and a spool that includes:
- a spool tube that is installed at the inside space of the sleeve and is configured to reciprocate in an axial direction of the spool;
- a spool cover that closes an end portion of the spool tube;
- a pressure accumulation space that is formed at an inside of the spool tube;
- a supply passage that is configured to connect between the pressure accumulation space and the supply port; and
- a control passage that is configured to connect between the pressure accumulation space and the primary control port or the secondary control port, wherein:

the spool forms a variable volume space between the spool and the sleeve bottom while the variable volume space is a space, a volume of which is variable;

the sleeve includes a breathing hole that communicates between the variable volume space and an atmosphere and is located at an outside of the inside space of the sleeve;

the sleeve further includes a drain port that is communicated with an outside of the valve timing adjustment device;

the spool further includes a drain passage that is configured to connect between the primary control port or the secondary control port and the drain port; and the drain port is formed integrally with the breathing hole.

* * * * *